June 23, 1970 R. C. PEYTON 3,517,165

ARRANGEMENT FOR HANDLING PRINTABLE CHARACTER BIT CODES

Filed Sept. 26, 1966 2 Sheets-Sheet 1

INVENTOR
ROBERT C. PEYTON
By H. Christoffersen
Attorney

INVENTOR
ROBERT C. PEYTON
BY H. Christoffersen
Attorney 3,517,165
ARRANGEMENT FOR HANDLING PRINTABLE CHARACTER BIT CODES Robert C. Peyton, North Palm Beach, Fla., assignor to RCA Corporation, a corporation of Delaware Filed Sept. 26, 1966, Ser. No. 582,016
Int. Cl. B41j *5/38;* G06k *3/00*
U.S. Cl. 235—61.9 7 Claims

ABSTRACT OF THE DISCLOSURE

A web drive means such as a paper tape driver, is used to enter printer bit codes directly into the buffer memory of a high speed printer. The printer bit codes are stored on a web in an order corresponding to the order of characters on the printer's font.

This invention relates to printers and, in particular, to an arrangement for handling and storing the bit codes of the printable characters appearing on a character font carrier, e.g. print drum or chain.

In most drum and chain printers, information representing a character, e.g., a letter, number, symbol, etc., to be printed at a given print location on a document is compared with the bit codes of the printable characters on the drum or chain as the different characters are moved individually into printing position. When the character on the carrier corresponding to the character to be printed is moved into printing position, an "equality" signal is generated to actuate a print hammer or other recording device.

In prior art systems, these printer bit codes generally have been generated or made available in the proper time sequence in one of three ways. The first technique is to employ a code wheel or disk which is rotatd in synchronism with the movement of the font carrier. The bit codes are spaced on the wheel or disk so that the bit code for any character on the carrier is presented to a set of transducers as that character moves into a given print position. A disadvantage of this type of arrangement is that the bit codes may not be compatible with the coding employed in the system in which the printer is embodied, e.g. the bit codes and the print data may not be similarly coded. Hence, a differently coded disk must be supcreasing the cost of the system. Moreover, the transducers plied for each user system of different code, thereby insometimes operate unreliably, especially as they age.

A second technique employed in the prior art is to employ a timing disk which is driven in synchronism with the font carrier and which generates a timing pulse as each different character moves into printing position. In addition, the timing disk may generate a single index pulse per revolution. The index pulse is used to set or initialize a counter to a reference count. Thereafter, each timing pulse advances the count in the counter, and the counter is arranged so that its outputs are, or can be translated to, the correct bit codes. As in the first-mentioned technique, the code corresponding to a given count may not correspond to the code for that character in the overall system in which it is employed. In that case, a different decoder must be employed in each system having a different code format.

A third technique employed in the prior art employs the timing disk and counter aforementioned, but differs in that the output of the counter is used to generate the address of a memory storage location in which the e-sired bit code is stored. In such a system, the bit codes for the various printable characters are normally entered into the correct locations of the memory by program control. A separate print buffer memory usually is employed to store both the bit codes and the information to be printed. In such an event, the print codes first must be entered into the main memory and thereafter transferred to the buffer memory by program control. The objections to this technique are that an undesirably large amount of main memory space is required, and additional instructions must be provied in the instruction format to control the entry and transfer of the bit codes.

Accordingly, it is one object of this invention to provide an improved technique for handling the bit codes corresponding to the printable characters on the font carrier.

It is another object of this invention to provide an arrangement for handling the printer bit codes, which arrangement does not require the use of a code disk or timing disk.

It is still another object of the invention to provide a bit code handling arrangement which employs a printer buffer memory, but which does not require use of the main memory or special instructions to enter the bit codes into the buffer memory.

Many conventional printers employ a prepunched paper tape loop to control advance of the recording medium, e.g., paper or document. Such a tape loop is driven in synchronism with the paper, and may have several parallel channels in which perforations may appear. At the initiation of a paper movement command, any desired channel on the tape loop may be selected by program control, and the paper movement is stopped when a punched hole is sensed in the selected one of the channels.

It is a further object of this invention to provide a printer bit code handling arrangement which makes use of the tape loop drive and reader.

In apparatus embodying the invention, the bit codes to be stored in the printer memory are recorded on a tape loop. This tape loop is placed on the tape drive in the place of the tape loop normally used to control document movement. The tape is run and the outputs of the tape reader, representing the bit codes, are transferred to the printer memory. Thereafter, the bit code tape loop is removed and replaced by the paper control tape loop.

Figures 1, 2, 4:
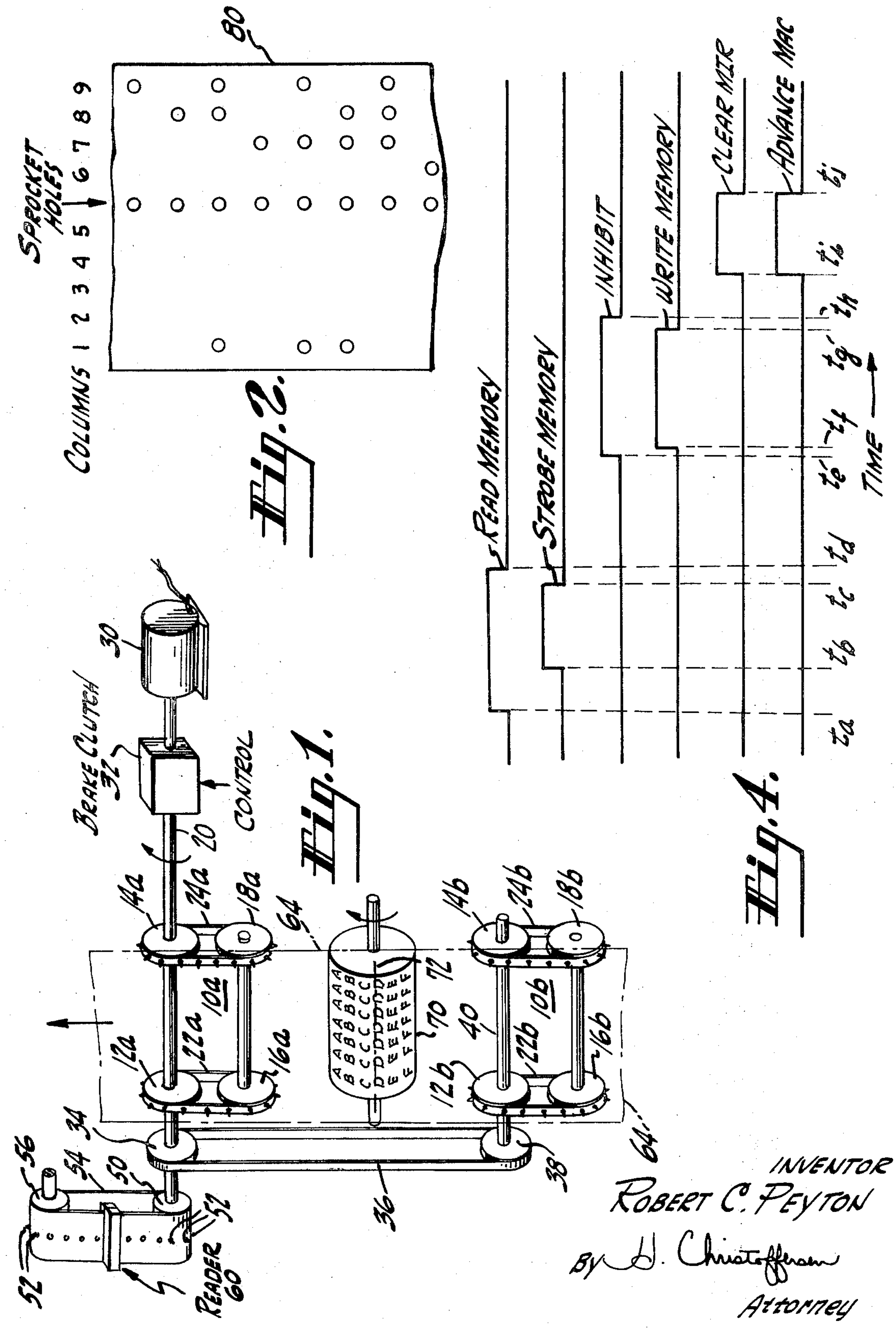
FIG. 1 is a diagram of a type carrier, paper moving mechanism and related components of a high speed electromechanical printer.
FIG. 2 is a diagram of a portion of a removable tape loop on which the printer bit codes are recorded.
FIG. 4 is a set of waveforms useful in describing the operation of the FIG. 3 logic arrangement.

The mechanical portion of the printer system of FIG. 1 includes two sets of paper tractors 10*a* and 10*b*. Tractor set 10*a* includes first and second wheels 12*a*, 14*a* mounted on a rotatable shaft 20 and cooperating with idler wheels 16*a* and 18*a*, respectively. A sprocket belt having projecting teeth thereon is driven by wheel 12*a* and, in turn, drives idler wheel 16*a*. A similar belt 24*a* is driven by wheel 14*a* and, in turn, drives wheel 18*a*. Tractor assembly 10*b* is similar to assembly 10*a*, and like components therein are designated by the same reference numerals followed by the alphabetic character *b*.

Shaft 20 is driven from a motor 30 by way of a brake-clutch mechanism, represented by a block 32. Motor 30 is energized continuously, but only turns shaft 20 when a control signal is applied to the brake-clutch assembly 32 to release the brake therein and energize the clutch. A pulley 34 is mounted on shaft 20 and driven thereby. Pulley 34, in turn, drives a belt 36, which may be a V-belt, for example, and the belt 36 drives a pulley 38 fixed on the lower tractor shaft 40. Thus, when shaft 20 is rotated by the motor 30, wheels 12*a* and 14*a* are driven directly by shaft 20, and shaft 40 is driven by way of the pulley assembly to rotate wheels 12*b* and 14*b* in the lower tractor assembly.

Also mounted on shaft 20 for rotation thereby is a drum or wheel 50 having sprocket teeth 52 arranged in a circumferential band thereon. A tape loop 54, which may be a paper tape loop, for example, has a channel of apertures therein spaced to mate with the sprocket teeth 52. Tape loop 54 is driven by drum 50 at the lower end and, in turn, drives an idler sprocket drum 56 at its upper end. Tape loop 54 may have a plurality of channels or tracks thereon which are parallel to the channel of sprocket holes. As is known in the prior art, holes may be punched in various ones of these channels and detected by a reader 60 to control the brake-clutch 32, and thereby stopping of the paper tractors. Reader 60, for example, may be a photoelectric reader having one photosensitive transducer for each channel on the paper tape loop 54.

The logic associated with the reader 60 for controlling paper movement is not shown, but is well-known in the art. For example, when it is desired to move the paper 64 (shown in phantom), a control signal is applied to the brake-clutch assembly. Motor 30 then drives shaft 20 to rotate the wheels in the tractor assemblies. The paper 64 has a series of apertures along both vertical edges which are engaged by the sprocket teeth and driven thereby as the shaft 20 is rotated. Tape loop 54 also is driven by shaft 20 at this time. When the reader 60 detects a perforation in a selected channel of the tape loop, logic (not shown) responds to this signal and removes the enabling control signal from the brake-clutch assembly 32, whereby the brake is energized and shaft 20 is stopped.

A type carrier, illustrated as a type drum 70 is located between the tractor assemblies and on the rear side of the paper or document path. The paper 64 is spaced close to the drum 70, which drum rotates continuously. On the front side of the paper is located the ribbon and hammer assemblies (not shown for clarity of drawing). The type carrier could, alternatively, be a chain which carries a set of type font.

For proper operation of the printer, means must be provided for identifying the character on the print drum 70 which is in print position. Assuming, for example, that the center of the document print line, or the center of the print station is identified by the center line 72, and that the drum is rotating in the direction indicated, it may be seen that the type character D is in print position in each column along the print line. As the drum 70 rotates, and the next type character E approaches printing position, some means must be provided for generating a signal indicating that this character E is approcahing print position, since this generated character must be compared with all of the characters to be printed along the document line to determine whether or not one or more of the print hammers should be energized. The various techniques known in the purior art for generating these signals, known as "printer code bits" or characters are described briefly in the introduction hereinabove. According to one of these techniques, the printer bit codes are stored in a printer buffer memory. The novel manner in which these printer bit codes are entered into the memory in apparatus embodying the invention now will be described.

Tape loop 54 (FIG. 1), which may be a paper tape loop as described, is readily removable from the drums 50 and 56. In practicing the present invention, an additional tape loop is prepared which has recorded thereon the bit codes for all of the type characters appearing in a column or circumferential band of the print drum 70. A portion of such a tape loop is illustrated in FIG. 2.

The sequence of coded characters punched or otherwise recorded on the tape loop 80 of FIG. 2 is the same as the sequence of the corresponding type characters in a column or circumferential band of the drum 70 (FIG. 1). Thus, if the alphabetic characters run consecutively from A to Z on the print drum, then the coded characters A through Z appear in sequence on the tape 80. The particular code employed for these characters on the tape loop 80 is selected to be the same as that in the overall system in which the printer is to be embodied. Since the cost of the tape loop is relatively inexpensive, it can be seen that tapes can be prepared at very low cost to be compatible with the different codes employed in different information handling systems. Furthermore, if the print drum 70 should be replaced by one in which the type characters appear in a different sequence, a new tape can be prepared for that drum at very little cost. This is a distinct advantage over prior art systems which employ counters and decoders or character disks and the like.

When the printer is installed, or when it is first being prepared for operation, the paper tape loop 54 (FIG. 1) containing the control information for paper movement is removed from the sprocket drums 50 and 56 and is replaced by the paper tape loop 80 (FIG. 2), which contains the printer bit codes. The shaft 20 then is rotated by the motor 30 and the printer bit codes are read from the tape 80 by reader 60 and entered into the printer buffer memory in a manner to be described. At this time, the paper 64 may be removed from the tractor assemblies 10*a* and 10*b* to prevent feeding of paper, if it is so desired.

Figure 3:
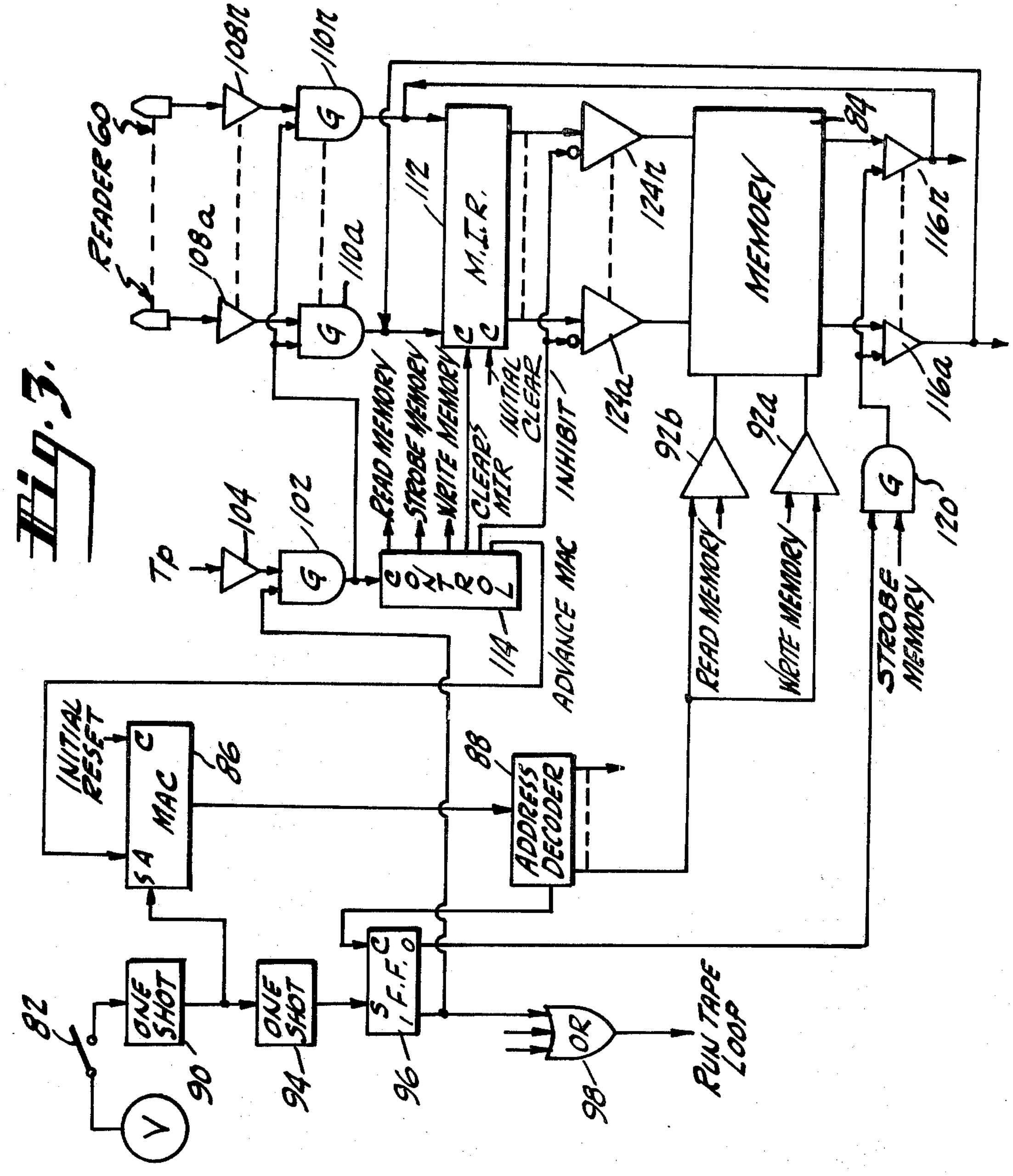
FIG. 3 is a block diagram of a logic arrangement for transferring the bit codes from the tape loop to the printer buffer memory.

The logic for controlling the brake-clutch assembly 32 of FIG. 1 and for controlling the transfer of information from the reader 60 to the print buffer memory 84 is illustrated in FIG. 3. In FIG. 3, box 84 represents the printer buffer memory into which it is desired to read the printer bit codes from the perforated tape loop 80. This buffer memory also stores the data for the characters to be printed on a line of the document. However, since the manner of entering this data into the memory and retrieving same is not of concern to the present invention, discussion thereof will be omitted.

Before describing the logic in FIG. 3 it should be mentioned that the bit codes on the tape loop 80 are entered directly into the buffer memory 84, and not by way of the main computer memory. Also, the control of the brake-clutch assembly of FIG. 1 during this operation, and the transfer of information from the tape loop 80 to the memory 84 is independent of the operation of the computer system in which the printer may be embodied. Thus, no main memory space is required for this operation and no instructions need be provided in the instruction format for controlling the transfer of data.

The locations into which the bit codes are entered into the memory are controlled by a memory address counter 86. At the start of an operation, the paper tape loop 80 containing the bit codes may be positioned on the drums 50 and 56 (FIG. 1) such that the bit code corresponding to the "starting" character on the print drum 70 is opposite reader 60, or slightly downstream therefrom.

The operator depresses a switch 82 or button to apply a voltage pulse to a first one-shot 90. This one-shot then applies a signal at the set (S) input of the memory address counter 86. The various stages of the counter are so connected that a signal applied at this set input switches the memory address counter to a count corresponding to the address in memory 84 into which the bit code for the starting character is to be entered. The output of address counter 86 is decoded in unit 88. Each output of decoder 88 is connected to a separate WRITE memory driver and a READ memory driver, one set 92*a*, 92*b* being shown at the left of the memory.

One-shot 90 also triggers a second one-shot 94, the output of which sets a control flip-flop 96. This flip-flop has its (1) output terminal applied as one input of an OR gate 98, the output of which is applied to the control input of the brake-clutch assembly 32 (FIG. 1) to engage the clutch and operatively couple shaft 20 to the motor 30. Other inputs to this gate 98 may be supplied from the computer, for example, to effect movement of the paper during a print operation. Flip-flop 96 also has its (1) output applied at one input of a first coincidence gate 102.

In the example of the paper tape loop 80 illustrated in FIG. 2 it will be noted that the character bit codes are aligned with the sprocket holes in the tape loop. In that event, a transducer may sense the sprocket holes to provide timing pulses for the logic arrangement. These timing pulses are applied through an amplifier 104 to a second input of the first fiate 102. In other arrangements, as wherein the sprocket holes are not aligned with the bit codes, a separate channel of the tape may be used for timing pulses. Alternatively, a timing disk may be mounted on shaft 20 to provide these timing pulses.

Those of the remaining transducers in reader 60 (FIG. 1) which are located to sense the channels of the tape 80 containing the bit code information have their outputs applied through separate amplifier 108*a* . . . 108*n* to the inputs of separate coincidence gates 110*a* . . . 110*n*, respectively. A second input to each of the latter gates is coupled to the output of the first coincidence gate 102, and the outputs of the second coincidence gates 110*a* . . . 110*n* are supplied as inputs to separate stages in a memory input register 112. Thus, as each bit code is read by reader 60, a timing pulse enables first gate 102, and the output thereof gates the reader outputs (bit code) into the memory input register 112.

A second output of first gate 102 is applied to a box 114 labeled "CONTROL." The control unit may be, for example, a string of cascaded one-shots. Alternatively, the control device may be a tapped delay line having various outputs connected to set individual flip-flops and having other outputs connected to reset the flip-flops.

FIG. 4 is a timing diagram illustrating the various outputs of the control unit 114. As shown there, the first output is a pulse labeled "READ MEMORY" which has a duration from $t_a$ to $t_d$. A second output labeled "STROBE MEMORY" is generated during the read memory pulse from $t_b$ to $t_c$. The read memory pulse is applied to the gates 92*b* and fully enables the appropriate read driver to drive current through the appropriate memory line to clear or read out that portion of the memory addressed by the memory address counter 86. During a normal operation, as when the data to be printed is being read out of memory, it is desired that the information be recirculated and returned to memory. This is accomplished by applying the memory outputs to a set of sense amplifiers 116*a* . . . 116*n*, the outputs of which are read back into the memory input register. However, when the printer bit codes are being read into memory, no recirculation and rewriting is to take place. The strobe memory pulse is applied as one input to a gate 120, the output of which, when enabled, allows the information from the memory to pass through the sense amplifiers 116*a* . . . 116*n*. The second input to this gate is coupled to the (0) output of the control flip-flop 96. Since this output is "low" during a read-in of the printer bit codes, gate 120 is disabled, and the sense amplifiers 116*a* . . . 116*n* are rendered inoperative.

The next output pulse generated in the control unit 114 is an inhibit pulse beginning at time $t_e$ and ending at time $t_h$. This pulse enables a set of input amplifiers 124*a* . . . 124*n* and allows the information in the memory input register to pass to the memory input lines. A write memory pulse lasting from $t_f$ to $t_g$ is generated by the control unit 114 and fully enables the selected write amplifier 92*a* to effect a write-in to memory of the information supplied through the drivers 124*a* . . . 124*n*. At this time, the bit code for the first or starting character on the tape loop has been read into the location of the buffer memory 84 addressed by counter 86.

At $t_i$, a pulse labeled "CLEAR MIR" (FIG. 4) is generated and applied to the clear or reset input terminal of the memory input register 112 to reset all of the stages therein. At the same time, a pulse is generated by the control unit 114 and applied to the advance terminal of the memory address counter 86. This counter 86 now stores a count corresponding to the proper address in the memory 84 into which it is desired to enter the bit code for the second type character. When the next character or bit code on the tape loop 80 is moved opposite the reader 60, the aforementioned sequence of events is repeated. In brief, the timing pulse fully enables first gate 102, and the output thereof gates the bit code for the second character through amplifiers 108*a* . . . 108*n* and gates 110*a* . . . 110*n* to the memory input register 112. The first output of the control unit 114 reads out the old information stored in the memory at the address for the second bit code. Thereafter, the inhibit output of the control unit is applied to the drivers 124*a* . . . 124*n* to read the output of the memory input register into the memory under control of the write pulse applied to the addressed write amplifier 92*a*. The memory input register then is cleared and the memory address counter is advanced.

The clear or reset input of the control flip-flop 96 is connected to that output of the address decoder 88 which produces a signal when the count stored in the memory address counter is one more than the address for the memory location of the last bit code on the tape loop 80. When this event occurs, flip-flop 96 becomes reset, the enabling signal applied to the OR gate 98 is removed, and the enabling signal is terminated at the input of the brake-clutch assembly 32 (FIG. 1). Also, first coincidence gate 102 becomes disabled by the (1) output of the flip-flop 96 to prevent any further reading of bit codes to the memory input register. The (0) output of the control flip-flop 96 goes high at this time and partially enables one input to the strobe gate 120, whereby this gate now is in condition to permit recirculation of the information in memory 84 during a normal print operation.

At the termination of the aforementioned events, all of the printer bit codes are stored in the proper locations in the buffer memory 84. The bit code tape loop 80 then is removed from the sprocket drums 50 and 56 (FIG. 1) and the tape loop containing the information for controlling paper movement during a normal print operation is placed on the sprocket drums. The printer system now is in condition to carry out a normal print function and normal paper movement function.

It is thus seen that in practicing the present invention, the printer bit codes may be entered into the buffer memory without first having to be entered into the computer's main memory, and the entry of these bit codes into the printer memory 84 is done independently of the computer. It will be appreciated by one skilled in the art that most of the logic illustrated in FIG. 3 also is used during the normal print operation, and that only a small portion of this logic is used exclusively for the read-in of the printer bit codes.

Although the invention has been described in connection with type drums or chains and hammers associated therewith, it will be appreciated that the invention also has application in nonimpact printers, e.g. electrostatic or optical printers wherein the printable characters may be, for example, cutouts in a drum or belt. The phrases "font carrier" and "character font carrier" are used in a generic sense in the specification and claims to include those carriers wherein the printable characters are other than embossed, and the term "character" includes any desired symbol or mark.

What is claimed is:

1. In a printer having a character font carrier with at least one series of printable characters thereon, in combination:

means for moving said carrier in a direction to present the printable characters of said series one after another at given print position;

means for selectively moving a recording medium to be printed relative to said given print position;

a web drive means including a web means have a plurality of rows of information locations, lying in a direction normal to the direction said web is driven, for storing codes in successive rows;

an easily alterable memory means having a number of storage locations sufficient concurrently to store all of said codes stored on said web means;

addressing means coupled to said memory for indicating the locations in said memory means at which the respective codes on said web drive means are to be stored; and means including said web drive means and said addressing means for transferring said codes from said web means directly to the locations in said alterable memory means called for by said addressing means.

2. The combination as claimed in claim 1 wherein said web drive means comprises a rotatable paper tape drive means.

3. The combination as claimed in claim 1 wherein said web drive means is coupled to the means for moving said recording medium.

4. The combination as claimed in claim 1, further including manually operable switch means, and logic means responsive to the operation of said switch means for activating said means for transferring codes.

5. The combination as claimed in claim 4 wherein said means for transferring codes from said web means to the memory means includes further logic means operable in response to the operation of said switch means to control the transfer of codes.

6. In a printer having a character font carrier with at least one series of printable characters thereon, means for moving said carrier in a direction to present the printable characters of said series one after another at a given print position, and means for selectively moving a recording medium to be printed relative to said given print position, the combination of:

rotatable tape drive means coupled to said recording medium moving means;

a removable tape in engagement with said drive means and bearing printer bit codes corresponding to said printable characters, which codes appear on said tape in the same ordered sequence as the corresponding printable characters of said series appear on said carrier;

memory means;

manually operable switch means; and means for reading said printer bit codes from said tape to said memory means as said tape is driven by said tape drive means including counter means, means triggering said counter means after each different bit code is read into memory, and means responsive to a given count in said counter means for stopping said recording medium moving means, all operable in response to the operation of said switch means.

7. In a printer having a character font carrier with at least one series of printable characters thereon, means for moving said carrier in a direction to present the printable characters of said series one after another at a given print position, and means for selectively moving a recording medium to be printed relative to said given print position, the combination of:

an easily alterable memory means including means capable of storing codes corresponding to all characters on said character font carrier;

a web drive means including web means storing said codes; and a manually operable switch means, means including said web drive means, and further including counter means, means triggering said counter means for each different bit code entered into memory, and means responsive to a given count in said counter means for stopping said recording medium moving means all responsive to the operation of said switch means, for transferring said codes from said web means directly to said alterable memory means.

References Cited

UNITED STATES PATENTS

| | | | |
|---|---|---|---|
| 2,672,287 | 3/1954 | Reitfort | 235—61.7 |
| 2,787,952 | 4/1957 | Roche. | |
| 2,813,480 | 11/1957 | Fowler. | |
| 2,915,966 | 12/1959 | Jacoby. | |

FOREIGN PATENTS

| | | |
|---|---|---|
| 717,750 | 9/1965 | Canada. |

MAYNARD R. WILBUR, Primary Examiner

T. J. SLOYAN, Assistant Examiner

U.S. Cl. X.R.

101—93

UNITED STATES PATENT OFFICE

CERTIFICATE OF CORRECTION

Patent No. 3,517,165 Dated June 23, 1970

Inventor(s) Robert C. Peyton

It is certified that error appears in the above-identified patent and that said Letters Patent are hereby corrected as shown below:

Column 1, lines 47 and 48, "creasing the cost of the system. Moreover, the transducers plied for each user system of different code, thereby in-" should read ---plied for each user system of different code, thereby increasing the cost of the system. Moreover, the transducers---; lines 68 and 69, "the esired" should read ---the desired---. Column 3, line 61, "purior" should read ---prior---. Column 5, line 16, "fiate" should read ---gate---; line 24, "amplifier" should read ---amplifiers---. Column 7, line 5, after at insert ---a---.

SIGNED AND SEALED MAR 2 1971

(SEAL)
Attest:

Edward M. Fletcher, Jr.
Attesting Officer

WILLIAM E. SCHUYLER, JR.
Commissioner of Patents